United States Patent [19]

Weng

[11] Patent Number: 4,574,629
[45] Date of Patent: Mar. 11, 1986

[54] TIRE PRESSURE GAUGE HAVING ON-OFF MEANS AND BEING ASSEMBLED FROM THE TAIL END THEREOF

[76] Inventor: Hsi-Kuang Weng, No. 30, Lane Tsao Chung, Tsao Chung Li, Lu Kang Chen, Chang Hua Shien, Taiwan

[21] Appl. No.: 613,895

[22] Filed: May 24, 1984

[51] Int. Cl.[4] ........................ B60C 23/02; G01L 7/16
[52] U.S. Cl. ..................................... 73/146.8; 73/744
[58] Field of Search .............................. 73/146.8, 744

[56] References Cited

U.S. PATENT DOCUMENTS 2,903,888 9/1959 Gföll ............................... 73/146.8
4,193,295 3/1980 Curran ............................. 73/146.8

Primary Examiner—Donald O. Woodiel
Attorney, Agent, or Firm—Balogh, Osann, Kramer, Dvorak, Genova & Traub

[57] ABSTRACT

It is a new tire pressure gauge, which comprises a ventilation pin, a compressed spring to control the air flowing in or out of the gauge; the air entered the gauge will push a pressure piston moving along a scale housing, and the point where the pressure piston stops will indicate the tire pressure.

7 Claims, 3 Drawing Figures

TIRE PRESSURE GAUGE HAVING ON-OFF MEANS AND BEING ASSEMBLED FROM THE TAIL END THEREOF

BACKGROUND OF THE INVENTION

The current tire pressure gauges available on the market are of two types, one of which is the pointer-type gauge having a switch, while the other is a scale-ruler type. The latter type has a small size and an inside space without switching means. In measuring a tire pressure, the gauge inlet is pressed against the nozzle of the tire valve and the pressure reading is taken immediately; upon the gauge inlet being removed from the tire valve nozzle, the pressure will also be removed simultaneously, and the scale-ruler will return to "zero" position.

SUMMARY OF THE INVENTION

The object of the present invention is to improve the current tire pressure gauge by furnishing an on-off means in the honsing head (air gauge inlet) so as to overcome the aforesaid drawback.

Another object of the present invention is to improve the current tire pressure gauge by dividing it into two parts, i.e., a front portion that includes an air gauge inlet and pressure-containing means to prevent air leaking; a rear portion that includes the pressure containing part and a base being used as a bottom cap for assembling convenience and bearing therein the pressure of a compressed spring.

DETAILED DESCRIPTION

Figure 1:
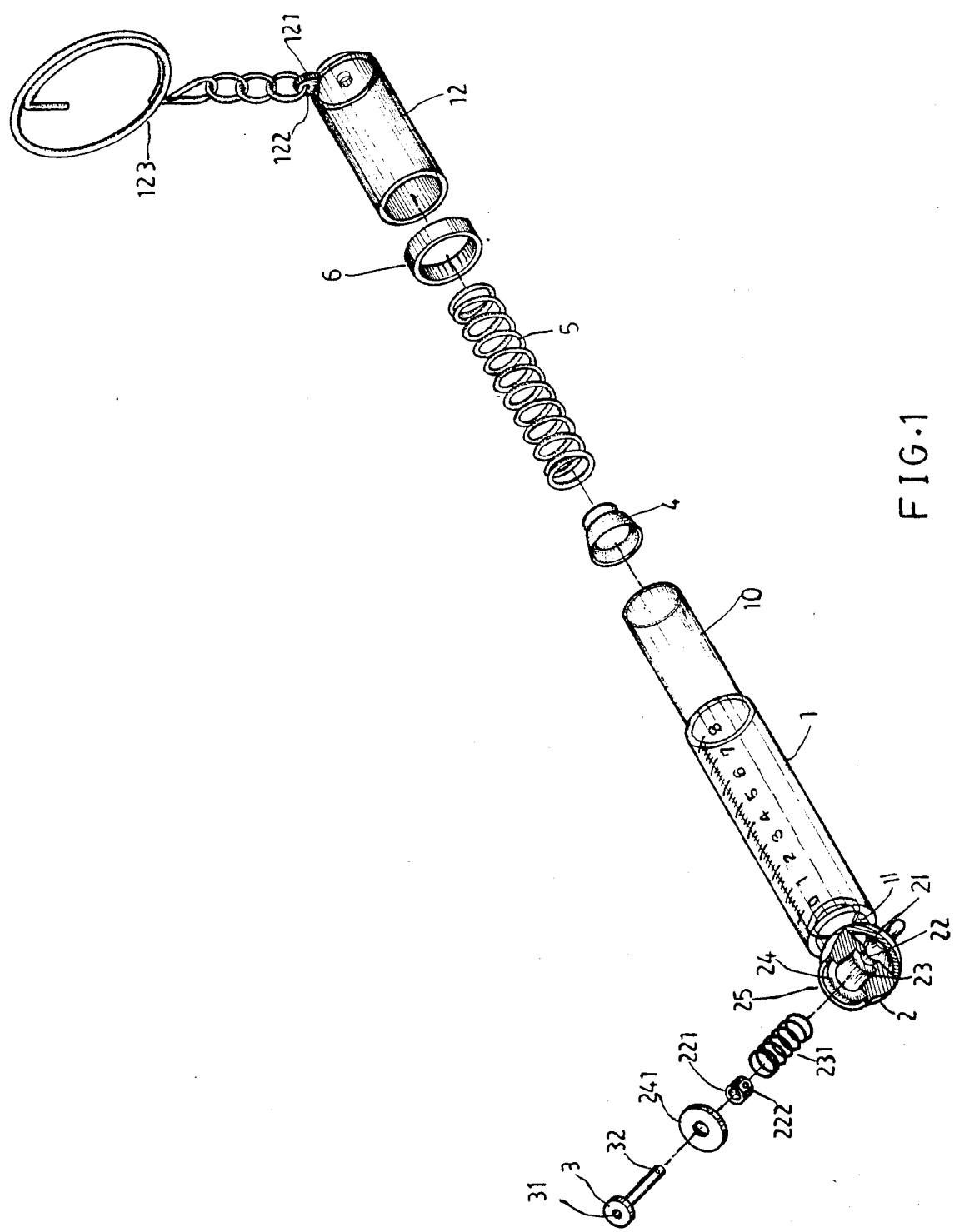
FIG. 1 is a perspective and exploded view of the present invention.
Figure 2:
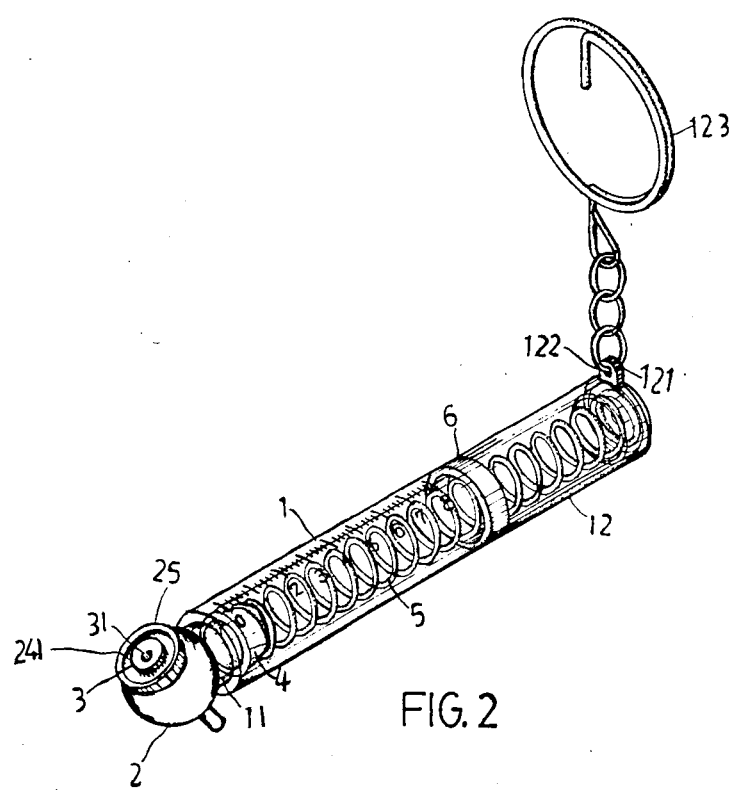
FIG. 2 is a perspective view of the present invention after being assembled.

Referring to FIG. 1, there is shown an exploded and perspective view of the present invention, of which a housing 1 is transparent cylinder with a scale to indicate pressure; the end portion of the housing 1 is an inner cylinder 10 (molded integrally into one piece with the housing 1) and having a very slight taper towards the end so as to closely couple with a couple housing 12. The inner diameter of the inner cylinder 10 is the same as that of the housing 1, but its outer diameter is smaller than that of the housing 1. The housing 1, a neck portion 11 and a housing head 2 are molded integrally into one piece. The inner bottom portion of the housing head 2 is furnished with an air passage 21, and on the top of the air passage 21, there is furnished a piston chamber 22, over the piston chamber 22, there is furnished a spring chamber 23 having a diameter larger than that of the piston chamber 22. Over the spring chamber 23, there is furnished a shim chamber 24 having a diameter larger than that of the spring chamber 23. Above the shim chamber 24 and outside of the housing head 2, there is furnished a circular flange 25. An on-off piston 221 having round pin holes 222 is mounted inside the piston chamber 22. A helical compression spring 231 is fitted inside the spring chamber 23. A shim 241 with a center hole is mounted inside the shim chamber 24. A ventilation pin 3 as shown in FIG. 1 has a pin hole passage 31, a blind bottom end, and two opposite pin holes 32 near the bottom end. The two opposite pin holes 32 must be aligned with the two pin holes 222 before the piston 221 can adhere to the bottom portion of the ventilation pin 3. A pressure piston 4 mounted from the rear end of the housing 1 has a slight taper towards the rear end on its front portion, and has a round rear end with equal diameter. Behind the pressure piston 4, there is mounted a spring 5 having a diameter larger than that of the rear end of the pressure piston 4. A decorative collar 6 has an inner diameter being equal to the outer diameter of the inner cylinder 10, while the outer diameter of the decorative collar 6 is the same as that of the housing 1. The inner surface of the coupling housing 12 is closely sleeved over the inner cylinder 10, while the outer diameter of the coupling housing 12 is the same as that of the housing 1. On the tail of the coupling housing 12, there is furnished a chain lug 121 having a chain hole 122, to which a key chain 123 may be attached.

In using the present invention, the ventilation pin 3 is pressed against the valve pin on a tire. Since the elastic shim 241 on the ventilation pin 3 is in close contact with the valve nozzle, there will be no air leakage. When the ventilation pin 3 is pressed against the tire valve nozzle, the ventilation pin 3 will depress the compression spring 231; naturally, the on-off piston 221 secured to the tail portion of the ventilation pin 3 will also be depressed to such an extent that the two ventilating pin holes 222 will enter into the bottom portion of the piston chamber 22. In that case, the high pressure air inside the tire will pass via the pin hole passage 31, the pin holes 32 and 222 and the air passage 21 and enter the housing 1 to compress the pressure piston 4, which will push the compressed spring 5 outwardly. When the air pressure in the housing 1 is equal to that of the tire, the pressure piston 4 and the pressed spring 5 will not move any further. Remove the pressure gauge from the valve of the tire; since no pressure is applied to the compression spring 231, the spring will restore to its original shape and push the shim 241 and the ventilation pin 3 outwardly; as a result, the on-off piston 221 at the tail portion of the ventilation pin 3 will also move upwards to such an extent that the two pin holes 222 on the on-off piston 221 will tightly be closed with the inner surface of the piston chamber 22; then, the housing 1 becomes a closely sealed air chamber. The tire pressure reading will be indicated by a point where the index line on the round edge of the front end of pressure piston 4 is positioned on the scales on the surface of the transparent housing 1.

After the pressure reading is noticed, the user may, with a finger, push down the ventilation pin 3 so as to have the on-off piston 221 at the tail of the ventilation pin 3 moved downwards a given displacement to let the two pin holes 222 on the on-off piston 221 pass through the bottom of the piston chamber 22 so that, the high pressure air inside the housing 1 will be vented through the pin holes 222 as a result of the restoring force of the compressed spring 5; the air will flow into the atmosphere through the pin hole passage 31 of the ventilation pin 3. Thus, the pressure piston 4 on the compressed spring 5 will return to its original position, the "zero" scale. In the conventional pressure gauge, a spring seat is usually furnished at the tail end of the gauge, and it is simply a flange at the end of metal of housing, being bent inwards the housing; as a result, the tail end of the housing is unable to be furnished with a hook lug. Now, the tail end of the present invention may be furnished with a hook lug 121 being formed integrally with the coupling housing 12.

The reverse-assembling (or tail-end assembling) steps and the operation steps of the present invention:

In the conventional pressure gauge, there is only one housing, of which the tail end should be bent inwards into a flange to be used as a spring seat; therefore, there is no way to assemble any parts thereof from the tail end. In that case, the high pressure air inside the housing will be leaked out of the seam between the housing head and the housing. In the present invention, the housing is made into two sections, i.e. the front and the rear sections. The front section includes a housing head 2 and an inner cylinder, which are formed integrally into one piece; it is impossible to have a leak. The rear section is a coupling housing 12, which is to be sleeved over the inner cylinder 16 with a press fit after all parts have been assembled into the housing. Since the inner cylinder has a slight taper, the coupling housing 12 can tightly be fixed thereon and can bear the pressure of the spring therein.

Figure 3:
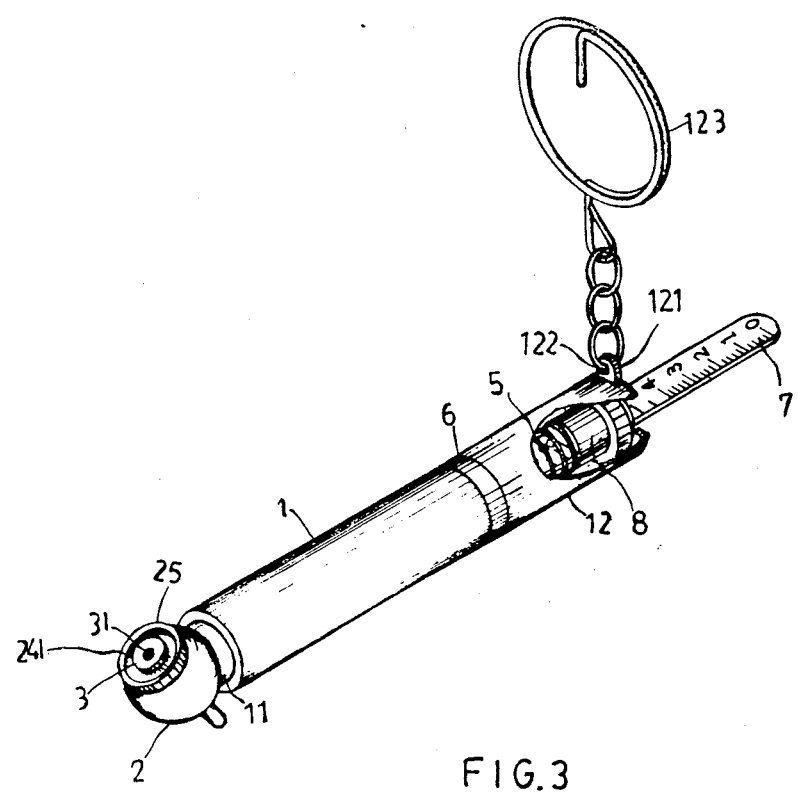
FIG. 3 is a perspective view of another embodiment of the present invention.

FIG. 3 illustrates a perspective view of another embodiment of the present invention, which is in reverse-assembling structure, can still be mounted with a conventional extension type of pressure scale. The feature of that embodiment is that after all the parts are assembled in the housing 1, a pressure scale 7 is mounted in the center of the compressed spring 5 behind the pressure piston 4. On the tail end of the coupling housing 12, there is furnished a round check head 8 of the pressure scale; in the center of the check head, there is furnished a rectangular hole (not shown), through which the pressure scale 7 can move back and forth. A decorative collar 6 is mounted over the inner cylinder 10; then, the coupling housing 12 is tightly sleeved over the inner cylinder 10 having slight taper.

In use, a user can read the tire pressure by looking at the length of the pressure scale pushed out of the housing.

The special features of the present invention:

1. Since all the parts are to be assembled from the tail end of the housing, the assembling precedures are simple, and the pressure gauge of the present invention may be manufactured in a mass production manner.

2. Since the housing and the housing head are molded integrally into one piece, the high pressure air entering the housing through the pin hole is stored in an air-tight chamber; there is never a leak like in the conventional pressure gauge. In other words, the air pressure of tire measurement with the present invention will be an exact pressure.

3. Since there is furnished an on-off valve means, the pressure scale will always indicate the pressure measured after the gauge is removed from the tire; therefore, the pressure indicated will last for a sufficient time for reading convenience.

4. Since the present invention can be assembled through its tail end, it makes the assembling work faster than that of the conventional pressure gauge; it may mean that it takes almost 50% time shorter to assemble, and costs less.

5. The tail-end assembling method may also be applied to the extension type of pressure gauge.

6. In the present invention, there is furnished a decorative collar mounted between the housing and the coupling housing; it gives the pressure gauge a more elegant appearance. It is deemed a novel design to the present invention.

7. On the tail end of the coupling housing, there is furnished a hook lug for hooking up a chain for carrying convenience as well as measuring convenience so as to insure more driving safety.

I claim:

1. A tire pressure gauge adapted to be assembled from its tail end, comprising a housing head to be pressed against a tire valve, air valve means slidably positioned within said housing head, pressure measuring means secured to said housing head, said pressure measuring means including a housing terminating in an inner cylinder, a coupling housing intimately engaging said inner cylinder and completing a pressure chamber with said housing, a scale associated with said housing, and a pressure member cooperatively engaged with said scale to provide an air pressure reading, and an on-off means for controlling air movement into and out of said pressure chamber.

2. A tire pressure gauge as claimed in claim 1, wherein said air valve means includes a ventilation pin, and said on-off means include an on-off piston, a compressed spring and a shim.

3. A tire pressure gauge as claimed in claim 2, wherein said on-off means further include an air passage, a piston chamber, a spring chamber, and a shim chamber.

4. A tire pressure gauge as claimed in claim 2, wherein said ventilation pin includes a stem provided with a longitudinally extending pin hole passage, and spaced pin holes at the inner end of said stem, said pin holes being adapted to align with a corresponding number of pin holes in an on-off piston attached to said ventilation pin.

5. A tire pressure gauge as claimed in claim 1, wherein said housing is made from a transparent material and said scale is supported on said transparent housing, whereby upon pressure being applied to the gauge, the pressure member will depress a compressed spring and stop at the balanced pressure point to indicate on the scale a reading of the tire pressure.

6. A tire pressure gauge as claimed in claim 1, wherein said scale is in the form of a stick adapted to extend out of said coupling head to provide a pressure reading against the edge of said coupling housing.

7. A tire pressure gauge as claimed in claim 1, wherein said inner cylinder possesses a tapered configuration and said coupling housing contains a tapered chamber adapted to be tightly sleeved over the inner cylinder to provide said air-tight pressure chamber.

* * * * *